(12) United States Patent
Fetherston

(10) Patent No.: US 12,301,065 B2
(45) Date of Patent: May 13, 2025

(54) CABLE-LOCKED POSITION SENSORS AND GEAR MOTORS

(71) Applicant: Shaun William Fetherston, Trabuco Canyon, CA (US)

(72) Inventor: Shaun William Fetherston, Trabuco Canyon, CA (US)

( * ) Notice: Subject to any disclaimer, the term of this patent is extended or adjusted under 35 U.S.C. 154(b) by 433 days.

(21) Appl. No.: 17/941,514

(22) Filed: Sep. 9, 2022

(65) Prior Publication Data

US 2024/0088757 A1  Mar. 14, 2024

(51) Int. Cl.
*H02K 11/21* (2016.01)
*F16H 59/02* (2006.01)
*H02K 7/10* (2006.01)

(52) U.S. Cl.
CPC ......... *H02K 11/21* (2016.01); *F16H 59/0217* (2013.01); *H02K 7/1004* (2013.01)

(58) Field of Classification Search
CPC ...... H02K 11/21; H02K 7/1004; H02K 5/225; H02K 7/116; F16H 59/0217
See application file for complete search history.

(56) References Cited

U.S. PATENT DOCUMENTS

| | | | | |
|---|---|---|---|---|
| 11,431,231 | B2* | 8/2022 | Fetherston | G01B 7/026 |
| 11,689,083 | B2* | 6/2023 | Fetherston | H02K 7/1004 |
| | | | | 310/68 E |
| 2008/0000317 | A1* | 1/2008 | Patton | F16H 19/06 |
| | | | | 623/32 |
| 2020/0144891 | A1* | 5/2020 | Menard | H02K 7/06 |

* cited by examiner

*Primary Examiner* — Xin Y Zhong
(74) *Attorney, Agent, or Firm* — Chang & Hale LLP

(57) ABSTRACT

Cable-locked position sensors are described that employ a flexible cable to couple rotation of a rotatable element, such as an output shaft of a gear motor, to a rotary position sensor. The disclosed sensors can be used to determine rotation and/or position of the rotatable element. The disclosed sensors are relatively small and inexpensive. The disclosed sensors may also be used as part of a servo motor, or in conjunction with gear motors to provide positional information for operation of the gear motor to thereby provide capabilities of a servo motor using an inexpensive gear motor.

11 Claims, 9 Drawing Sheets

CABLE-LOCKED POSITION SENSORS AND GEAR MOTORS

BACKGROUND

Field

The present disclosure generally relates to cable-actuated position sensors and to gear motors incorporating such sensors.

Description of Related Art

Position sensors can be used to measure the position and/or speed of a movable object. A cable-locked position sensor is a particular implementation of a position sensor that is designed to convert the movement of a cable into an electrical signal. Typically, the position sensor is mounted in a fixed position relative to the movable object and the cable is actuated due to movement of the object. In response to the movement, the cable extracts or retracts under the power of an internal, engineered spring which also maintains tension on the displacement cable throughout its stroke. An internal sensor produces an electrical output relative to the movement of the cable thereby giving an indication of movement of the object.

Position sensors can be used in conjunction with gear motors and servo motors to provide feedback related to the position and/or speed of the motor. This feedback can be used to control the motors.

SUMMARY

In some aspects, the techniques described herein relate to a cable-locked position sensor including: a feedback sensor pulley including a circumferential groove; a rotary position sensor mechanically coupled to the feedback sensor pulley, rotation of the feedback sensor pulley causing a rotatable element of the rotary position sensor to rotate, the rotary position sensor configured to output an electrical signal in response to a position or movement of the rotatable element; and a flexible cable received within the circumferential groove of the feedback sensor pulley, the flexible cable having a first end secured to a central portion of the feedback sensor pulley, the flexible cable routed through a first opening of the feedback sensor pulley, around the circumferential groove to make a complete rotation around the feedback sensor pulley, the flexible cable further routed to an output shaft and coupled to the output shaft, the flexible cable further routed back to the feedback sensor pulley and attached to the central portion of the feedback sensor pulley, wherein rotation of the output shaft causes the flexible cable to move to cause a corresponding rotation of the feedback sensor pulley which further causes rotation of the rotatable element of the rotary position sensor to thereby generate the electrical signal that is indicative of the position or movement of the output shaft.

In some aspects, the techniques described herein relate to a sensor further including a rotatable shaft coupled to the feedback sensor pulley and to the rotatable element to transfer rotational movement of the feedback sensor to rotational movement of the rotatable element.

In some aspects, the techniques described herein relate to a sensor further including a housing configured to house the feedback sensor pulley and the rotary position sensor.

In some aspects, the techniques described herein relate to a sensor, wherein the housing forms a circumferential protrusion that mates with a second circumferential groove of the feedback sensor pulley, wherein the feedback sensor pulley is housed within the housing in a way that the circumferential protrusion lies within a space left by the second circumferential groove so that the feedback sensor pulley is restrained in its vertical movement and allowed to rotate relative to the housing.

In some aspects, the techniques described herein relate to a servo motor including: a gear motor including a motor unit, a motor shaft, a gear box, and an output shaft coupled to the motor shaft by way of the gear box, the gear box having one or more gears coupled to the motor shaft and to the output shaft to cause multiple rotations of the motor shaft to result in a single rotation of the output shaft; a cable-locked position sensor coupled to the gear motor, the cable-locked position sensor including: a feedback sensor pulley including a circumferential groove; a rotary position sensor mechanically coupled to the feedback sensor pulley, rotation of the feedback sensor pulley causing a rotatable element of the rotary position sensor to rotate, the rotary position sensor configured to output an electrical signal in response to a position or movement of the rotatable element; and a flexible cable received within the circumferential groove of the feedback sensor pulley, the flexible cable having a first end secured to a central portion of the feedback sensor pulley, the flexible cable routed through a first opening of the feedback sensor pulley, around the circumferential groove to make a complete rotation around the feedback sensor pulley, the flexible cable further routed to the output shaft and coupled to the output shaft, the flexible cable further routed back to the feedback sensor pulley and attached to the central portion of the feedback sensor pulley; and circuitry configured to receive the electrical signal from the cable-locked position sensor, wherein rotation of the output shaft causes the flexible cable to move to cause a corresponding rotation of the feedback sensor pulley that further causes rotation of the rotatable element of the rotary position sensor to thereby generate the electrical signal that is indicative of the position or movement of the output shaft.

In some aspects, the techniques described herein relate to a servo motor wherein the sensor is configured to provide a signal corresponding to an angular displacement of the output shaft.

In some aspects, the techniques described herein relate to a servo motor wherein the circuitry is further configured to generate an absolute position of the output shaft based on the signal received from the sensor.

In some aspects, the techniques described herein relate to a servo motor wherein the circuitry is further configured to provide control of the absolute position or rotational angle of the output shaft based on the signal received from the sensor.

In some aspects, the techniques described herein relate to a conversion kit configured to provide functionality of a servo motor to a gear motor, the conversion kit including: a cable-locked position sensor configured to be mounted to a gear motor, the cable-locked position sensor including: a feedback sensor pulley including a circumferential groove; a rotary position sensor mechanically coupled to the feedback sensor pulley, rotation of the feedback sensor pulley causing a rotatable element of the rotary position sensor to rotate, the rotary position sensor configured to output an electrical signal in response to a position or movement of the rotatable element; and a flexible cable received within the circumferential groove of the feedback sensor pulley, the flexible cable having a first end secured to a central portion of the feedback sensor pulley, the flexible cable routed through a first opening of the feedback sensor pulley, around the circumferential groove to make a complete rotation around the feedback sensor pulley, the flexible cable further routed to an output shaft pulley that is configured to be coupled to an output shaft of the gear motor, the flexible cable further routed back to the feedback sensor pulley and attached to the central portion of the feedback sensor pulley; and circuitry configured to receive the electrical signal from the cable-locked position sensor, wherein rotation of the output shaft pulley causes the flexible cable to move to cause a corresponding rotation of the feedback sensor pulley that further causes rotation of the rotatable element of the rotary position sensor to thereby generate the electrical signal that is indicative of the position or movement of the output shaft pulley.

In some aspects, the techniques described herein relate to a conversion kit, wherein the cable-locked position sensor further includes a housing configured to house the feedback sensor pulley and the rotary position sensor.

In some aspects, the techniques described herein relate to a conversion kit, wherein the housing includes one or more features configured to facilitate mounting the cable-locked position sensor to the gear motor.

For purposes of summarizing the disclosure, certain aspects, advantages and novel features have been described herein. It is to be understood that not necessarily all such advantages may be achieved in accordance with any particular embodiment. Thus, the disclosed embodiments may be carried out in a manner that achieves or optimizes one advantage or group of advantages as taught herein without necessarily achieving other advantages as may be taught or suggested herein.

DETAILED DESCRIPTION OF SOME EMBODIMENTS

Figure 1A:
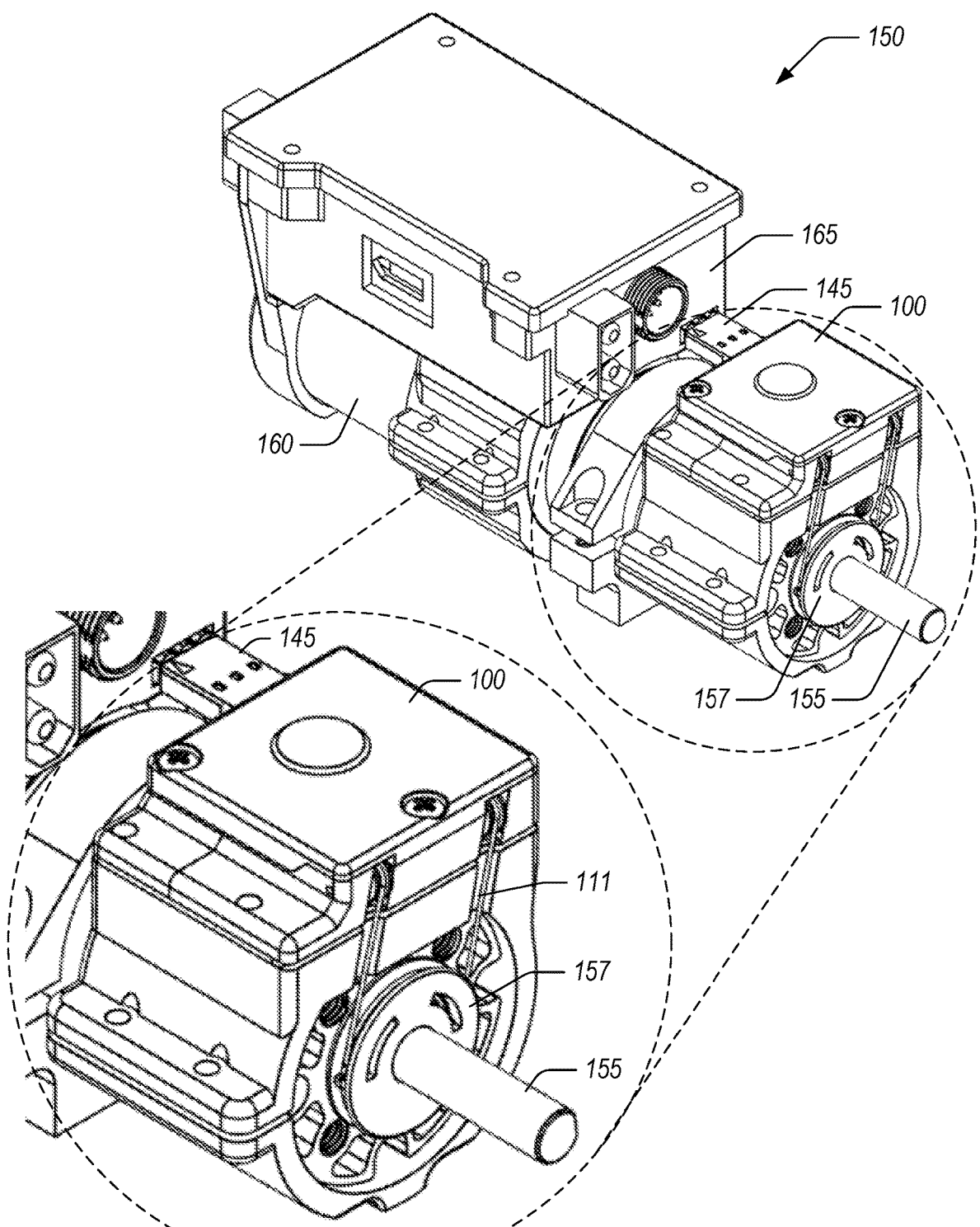
FIGS. 1A, 1B, 1C, and 1D illustrate an example embodiment of a servo motor that includes a gear motor coupled with a cable-locked position sensor to provide feedback regarding the angle or position, velocity, and/or acceleration of an output shaft of the gear motor.
Figure 1B:
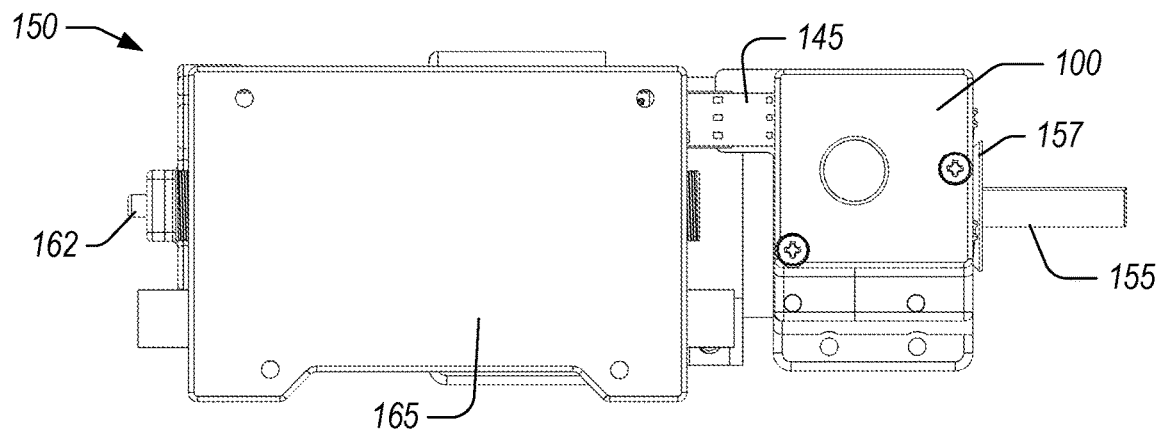
Figure 1C:
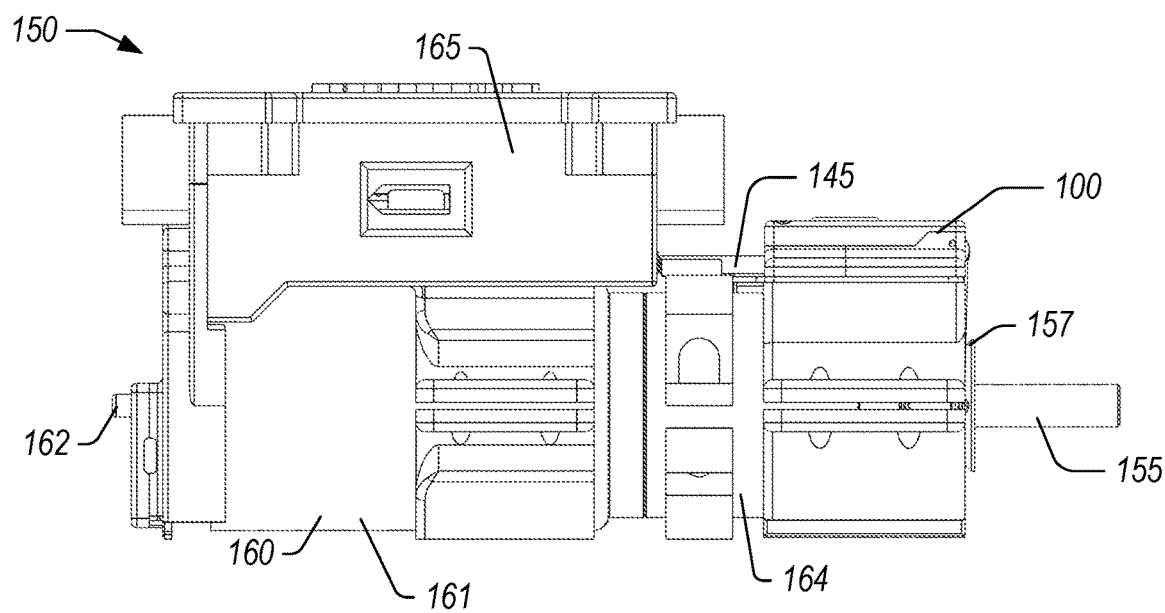
Figure 1D:
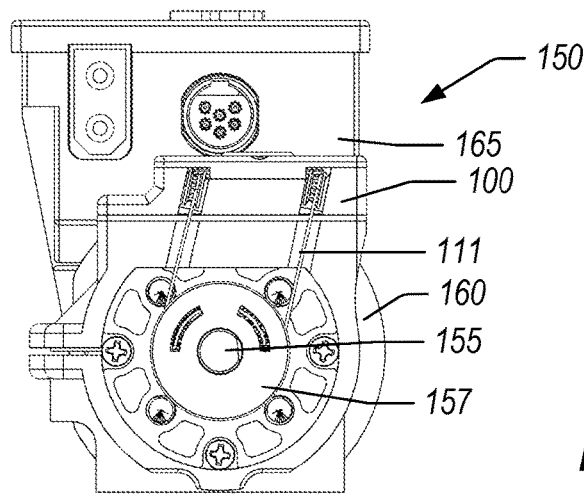

The headings provided herein, if any, are for convenience only and do not necessarily affect the scope or meaning of the claimed invention.

Overview

Devices that measure displacement via a flexible displacement cable find application in a variety of fields. These devices can be used, for example, in applications such as robotics, hydraulic cylinder position measurement, automotive and aerospace testing, factory automation, medical devices, oil and chemical, structural testing, industrial machinery, industrial factory automation, die-casting or injection molding, etc. Such devices typically include a flexible cable or other type of string or filament that can be extracted from and retracted into a spring-loaded drum or other similar mechanism. Extracting or retracting the cable causes the drum to rotate a rotary sensor thereby providing a measurement of displacement of the cable. These devices can be referred to as, for example, cable position transducers, cable-actuated position sensors, cable extension transducers, cable sensors, cable-actuated sensors, string pots, string potentiometers, string encoders, draw wire sensors, draw wire encoders, draw wire transducers, wire rope transducers, wire sensors, wire-actuated transducers, yo-yo pots, or yo-yo potentiometers.

Cable-actuated position sensors can be used, either individually or in combination with one another, to track linear, rotary, 2-dimensional, and 3-dimensional displacements. The sensors allow for flexible placement and mounting options and can be routed around barriers using pulleys and/or flexible conduits or guides outside of the sensor. Cable-actuated position sensors may also be used to measure the rotation of a component such as a shaft or pulley. However, such sensors may be expensive and/or relatively large.

Accordingly, to address these and other issues as well as to provide additional options in the market, described herein are cable-locked position sensors that employs a cable-locked configuration to measure rotation of a component, such as a shaft or pulley, based on rotation of a feedback sensor pulley that is part of the cable-locked position sensor. Locking rotation of the feedback sensor pulley to the component to be measured or tracked using a flexible cable or filament allows for a relatively simple, small, and inexpensive position sensor to be created and used in a variety of applications. For example, the disclosed sensors may also be used as part of a servo motor, or in conjunction with gear motors to provide positional information for operation of the gear motor. This allows a gear motor to be converted into a servo motor, or a gear motor with capabilities of a more expensive and more complex servo motor.

The disclosed sensors, transducers, and/or encoders provide a number of advantages over typical cable-actuated position sensors. Advantageously, some embodiments of the disclosed sensors can be relatively small. Advantageously, some embodiments of the disclosed sensors can be relatively inexpensive.

For example, the disclosed sensors can have a relatively small width, the width being slightly larger than the rotational sensor (e.g., potentiometer) used. As another example, the use of a cable-locked feedback sensor pulley makes it possible to use a small, inexpensive single turn potentiometer. As another example, cable-locking can be accomplished with an inexpensive flexible filament instead of expensive gears or belts, as used in typical cable-actuated position sensors.

The disclosed cable-locked position sensors can be used to provide position feedback for servo motors. Servo motors are electronic devices that move and that use position feedback to enable precise movement. Servo motors can be used in a variety of applications where it is beneficial to precisely control the movement, speed, and/or position of components. For example, servo motors can be used in robotics, CNC machinery, and/or automated manufacturing. Servo motors typically include a motor, an output shaft, a position sensor, and circuitry to control the motor based on feedback from the position sensor and in some cases gearing. The gearing in a servo motor enables precise movement of the output shaft with higher torque than ungeared motors. The gearing can be configured so that tens or hundreds of rotations of the motor shaft (i.e., the shaft directly coupled to the motor) corresponds to a single rotation of the output shaft, the output shaft being coupled to the gearing.

Although servo motors can be a useful tool, there are certain disadvantages inherent in current designs. For example, servo motors can be expensive and difficult to implement. They may require expensive motors, complicated control systems, and/or complicated or expensive sensors. This cost and complexity keep this technology out of reach for individuals or small companies with limited resources. Moreover, the cost may be prohibitive for certain implementations that may require a relatively large number of servo motors.

Accordingly, to address these and other related issues and to provide choice in the market, described herein are examples of servo motors or gear motor conversion kits. The disclosed motors and conversion kits use inexpensive gear motors in conjunction with inexpensive cable-locked position sensors to create an easy-to-implement and cost-effective servo system.

A cable-locked position sensor is coupled to the output shaft of a standard gear motor by connecting the cable to the output shaft (or to a pulley coupled to the output shaft, e.g., an output shaft pulley) and to a pulley coupled to the feedback sensor (e.g., a feedback sensor pulley). The cable is connected in a way that the cable is locked to the rotation of the output shaft (or the output shaft pulley) and to the rotation of the feedback sensor pulley. This means that rotation of the output shaft corresponds directly to rotation of the feedback sensor pulley (in any suitable ratio and not necessarily in a 1:1 ratio). This provides the same function as a geared connection, a belt-pulley connection, or a chain-sprocket connection but at a much lower cost. As the output shaft rotates, the cable-locked pulleys (i.e., the output shaft pulley and the feedback sensor pulley) transfer rotary motion of the output shaft to rotary motion of the feedback sensor. The output signal of the cable-locked position sensor can be used to track and to control the position, speed, and/or angle of the output shaft without needing to track the position or rotation of the motor shaft.

The cable locking is accomplished by securing one end of the cable or filament to the center of the feedback sensor pulley, e.g., with a loop over a center post in the pulley or a screw secured to the pulley. The cable exits from the center of the feedback sensor pulley through a hole or slot and makes a complete rotation around the feedback sensor pulley. This locks one end of the cable to the feedback sensor pulley. This also provides a length of cable sufficient for one complete rotation of the feedback sensor pulley. The cable is then fed to the output shaft pulley, either directly or around one or more support pulleys if the path of the cable is to be redirected. The cable enters the output shaft pulley through a hole or slot and traverses to the other side of the output shaft pulley around the output shaft. After exiting the opposite side, the cable makes a complete rotation around the output shaft pulley in the same direction as the loop around the feedback sensor pulley. This trip through the center of the output shaft pully and the loop around the output shaft pulley serves to lock the cable to the output shaft pulley so that rotation of the output shaft pulley forces the cable to move with the rotation. The cable is then routed back to the feedback sensor pulley where it enters through a hole or slot in the feedback sensor pulley and is secured to the center of the feedback sensor pulley, e.g., with a screw. Tension is applied to the cable prior to securing or fastening the cable to the feedback sensor pulley (e.g., by tightening the screw) to remove any slack in the cable between the feedback sensor pulley and the output shaft pulley.

With the cable secured to the feedback sensor pulley and slack in the cable removed, the two pulleys are locked together. Consequently, motor shaft rotations result in output shaft rotations, causing rotation of the output shaft pulley, causing rotation of the feedback sensor pulley, causing rotation of the rotary position sensor. Rotation of the rotary position sensor can be turned into a position feedback signal that can be used as feedback for the servo motor. Thus, adding a cable-locked position sensor to a gear motor can convert the gear motor into a servo motor because it allows the gear motor to be controlled using position feedback signals from the cable-locked position sensor.

Locking the feedback sensor to the output shaft of the gearmotor through this mechanism provides several advantages, as disclosed in greater detail herein. For example, the disclosed gear motors that measure rotation of the output shaft (using the disclosed cable-locked position sensors) are less complex than servo motors that track the position of the motor shaft. Another advantage is that the disclosed gear motors that use cable-locked position sensors with a cable that couples rotation of a rotary position sensor to rotation of the output shaft provide absolute position sensing which provide cost and/or complexity advantages over servo motors that only provide relative position sensing. Although position sensing has been accomplished by locking the output shaft to a position sensor, the disclosed cable-locked position sensors provide a substantial cost savings over gears, belts, chains, and other mechanical linkages from a rotary position sensor to a motor shaft.

Example Servo Motors with Position Sensors

FIGS. 1A, 1B, 1C, and 1D illustrate an example embodiment of a servo motor 150 that includes a gear motor 160 coupled with a cable-locked position sensor 100 to provide feedback regarding the angle or position, velocity, and/or acceleration of an output shaft 155 of the gear motor 160. The cable-locked position sensor 100 can be any of the cable-locked position sensors described herein with reference to FIGS. 2A-7. The combination of the gear motor 160 with the cable-locked position sensor 100 can act as a servo motor (i.e., the servo motor 150) by using feedback from the cable-locked position sensor 100. A servo motor is a small device that typically incorporates a motor (e.g., a DC motor or an AC motor), a gear train, a potentiometer, an integrated circuit, and an output shaft. The output shaft of a servo motor can be positioned to specific or targeted angular positions by sending a coded signal. Thus, the gear motor 160 can be converted to provide functionality similar to a servo motor by using the cable-locked position sensor 100 that provides feedback to circuitry 165 to control the angular position, velocity, and/or acceleration of the output shaft 155. Feedback is provided by the cable-locked position sensor 100 to the circuitry 165 using a feedback connector 145.

The gear motor 160 includes a motor unit 161 with a motor shaft 162. The motor shaft 162 is coupled to the output shaft 155 using one or more gears in a gear box 164. The one or more gears of the gear box 164 causes multiple rotations of the motor shaft 162 to result in a single rotation of the output shaft 155. The gear motor 160 is coupled to the cable-locked position sensor 100 to provide feedback to the circuitry 165 to convert the gear motor 160 to the servo motor 150. The cable-locked position sensor 100 includes a cable 111 that is coupled to an output shaft pulley 157 that is in turn coupled to the output shaft 155. The cable 111 includes any flexible cable-like material which may also be referred to as a filament, wire, string, thread, fiber, strand, cord, or the like. Rotation of the output shaft 155 causes the cable 111 of the cable-locked position sensor 100 to move which causes a rotary position sensor to rotate (e.g., the rotary position sensor 240 described herein with reference to FIGS. 2A-2E or the rotary position sensor 640 described herein with reference to FIG. 6). The locked movement of the output shaft 155 and the rotary position sensor provides an accurate position feedback signal that can be used by the circuitry 165 to determine absolute or relative position, velocity, and/or acceleration of the output shaft 155.

The circuitry 165 can be built into the gear motor 160. The circuitry 165 is electrically coupled to the motor unit 161 of the gear motor 160. The motor unit 161 is configured to cause the motor shaft 162 to rotate and, through the one or more gears of the gear box 164 coupled to the motor shaft 162, to cause the output shaft 155 to rotate. The motor unit 161 can be controlled with an electric signal. The motor unit 161 can be controlled to cause targeted movement of the output shaft 155. When the output shaft 155 is at a desired or targeted position, as determined using feedback from the cable-locked position sensor 100, an electrical signal can be supplied to the motor unit 161 to stop rotation of the motor. For example, an electrical signal can be reduced or stopped to slow and/or stop rotation of the motor of the motor unit 161. Otherwise, using feedback from the cable-locked position sensor 100, the circuitry 165 can be configured to determine the direction to turn the motor of the motor unit 161 to cause the output shaft 155 to turn to the desired or targeted position. Likewise, angular velocity and/or angular acceleration of the output shaft 155 can be controlled in a similar fashion using position feedback signals from the cable-locked position sensor 100.

In some embodiments, the servo motor 150 utilizes proportional control using feedback from the cable-locked position sensor 100. Proportional control includes controlling the speed of the output shaft 155 based at least in part on the difference between its actual position and a targeted position. In such embodiments, when the output shaft 155 is near the targeted position, it will turn slowly, otherwise it will turn fast.

The cable-locked position sensor 100 is coupled to the output shaft 155 by coupling the cable 111 to the output shaft pulley 157. As described herein, the cable 111 can be coupled to the output shaft pulley 157 in a way that locks movement of the cable to movement of the output shaft pulley 157. The output shaft pulley 157 is coupled to the output shaft 155 in such a way that rotation of the output shaft 155 results in rotation of the output shaft pulley 157. As the output shaft 155 rotates, the cable 111 of the cable-locked position sensor 100 moves with the output shaft pulley 157, transferring the rotary motion of the output shaft 155 to linear motion of the cable 111. The output signal of the cable-locked position sensor 100 is then used to track and to control the position, speed, and/or acceleration of the output shaft 155 without needing to track the position or rotation of the motor shaft 162.

Locking the cable-locked position sensor 100 to the output shaft 155 provides a number of advantages. One advantage is that the servo motor 150 is configured to measure rotation of the output shaft 155 using the cable-locked position sensor 100, which is less complex than a servo motor that tracks the position of the motor shaft 162. Another advantage is that the servo motor 150 with the cable-locked position sensor 100 coupled to the output shaft 155 provides absolute position sensing which is advantageous over servo motors that provide relative position sensing.

Moreover, the servo motor 150 may be advantageous over other servo motors that use position sensors to track rotation of a motor shaft because the servo motor 150 tracks the rotation of the output shaft 155. Servo motors that track the position or rotation of the motor shaft may provide a high degree of accuracy in the output shaft position but with the tradeoff of additional system complexity. In typical servo motors, the position sensor or encoder is connected to the motor shaft and must keep track of large numbers of motor shaft rotations for a single turn of the output shaft. For motors with high gear ratios, the motor may need to spin very fast. The faster the motor spins the more difficult it can be to track the position. Furthermore, high speed motors mean high frequency encoder pulses that may lead to complex electronics and more processing power. All of these factors contribute to increases in servo motor cost and complexity. In contrast, the servo motor 150 directly tracks the position, speed, and/or acceleration of the output shaft 155 using the cable-locked position sensor 100. This reduces cost and complexity of the servo motor 150.

In addition, the servo motor 150 provides absolute position sensing that may be advantageous over other servo motors that employ a relative position sensor or encoder. An issue created by the large number of rotations of the motor shaft relative to the small number of rotations of the output shaft is the need for a relative position sensor or encoder. It is impractical to track the absolute position of the motor shaft over hundreds or thousands of rotations. Consequently, typical servo motors utilize a relative sensor or encoder. A relative sensor is not capable of providing the exact position or angle of the output shaft without an initial reference point. As a result, each time the system is powered on the actual position or angle of the output shaft must be determined (e.g., by moving the output shaft to a known location to determine the initial reference point). This could be problematic if there are numerous servos that need this initial calibration or if the system design makes this difficult to accomplish. By connecting the cable-locked position sensor 100 directly to the output shaft 155, the number of rotations of the output shaft 155 that needs to be tracked is greatly diminished and the use of absolute position sensing is possible. Advantageously, with absolute position sensing there is no need to determine the actual position or angle of the output shaft 155 upon power up because the cable-locked position sensor 100 provides the actual position. As a result, operation of the servo motor 150 can begin immediately. System complexity is also decreased with absolute position sensing since additional hardware and software is not needed to interface with the relative position encoder and the sensors and software needed to determine the initial position are unnecessary.

The servo motor 150 uses the cable-locked position sensor 100 coupled to the output shaft 155. The signal from the cable-locked position sensor 100 is read by the circuitry 165 and is used to control the position or angle of the output shaft 155 based on a control signal. To reduce cost and complexity, the circuitry 165 can accept common, easily produced control signals like pulse width modulation (PWM) or analog voltages. Digital interfaces like RS-232, SPI or I2C could also be implemented for higher end applications. This enables off-the-shelf components, such as an Arduino board, and simple software to be used to create projects or products that bring a relatively high level of functionality at a relatively low cost.

In some embodiments, the gear motor 160 can be converted to the servo motor 150 using the cable-locked position sensor 100. In such embodiments, a conversion kit can be used to attach the cable-locked position sensor 100 to an existing gear motor. The electrical signals from the cable-locked position sensor 100 can be used as feedback to control the position, speed, and/or acceleration of the output shaft 155.

The servo motor 150 can be used in a variety of applications. For example, the servo motor 150 can be used to operate remote-controlled devices, radio-controlled devices, robots, vehicles and the like and can be used in industrial applications, robotics, in-line manufacturing, pharmaceutics, and food services.

Examples of Cable-Locked Position Sensors

FIGS. 2A, 2B, 2C, 2D, and 2E illustrate various views of an example cable-locked position sensor 200 that includes a feedback sensor pulley 210 coupled to a rotary position sensor 240. Although the term sensor is used throughout this disclosure, it is to be understood that the disclosed embodiments may be used and/or referred to as encoders and/or transducers.

Figure 2A:
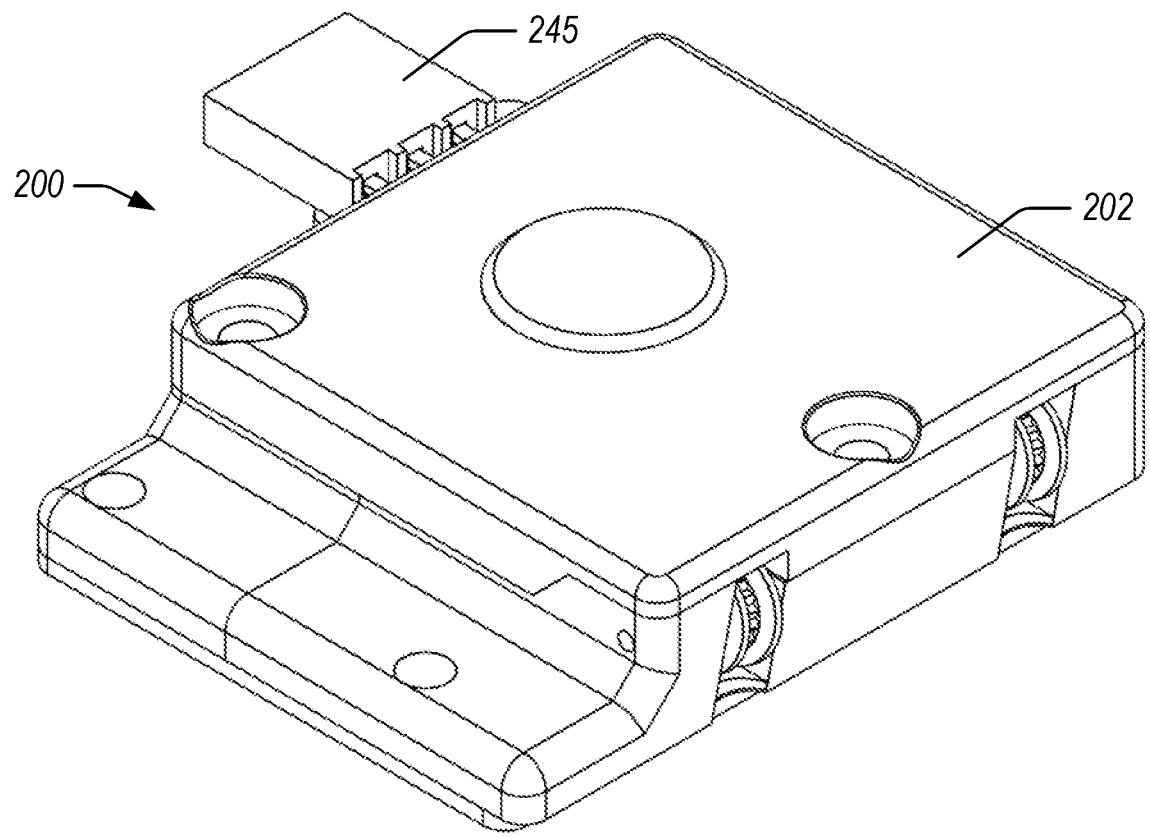
FIGS. 2A, 2B, 2C, 2D, and 2E illustrate various views of an example cable-locked position sensor that includes a feedback sensor pulley coupled to a rotary position sensor.

FIG. 2A illustrates the cable-locked position sensor 200 with a housing 202 that houses a sensor system (e.g., which includes the feedback sensor pulley 210, the rotary position sensor 240, and the sensor board 242). The housing 202 can be configured to be mechanically coupled to a gear motor (e.g., to a motor unit or gear box), such as the gear motor 160 (or the motor unit 161 or gear box 164) described herein with reference to FIGS. 1A-1D. The housing 202 can be of a unitary design or it can be made of two or more pieces that are secured together using adhesives, fasteners, friction, or the like. The housing 202 is configured to house components to provide protection and structural support to these components. The housing 202 can be made of any suitable material such as metal, plastic, or the like. The housing 202 can include one or more access ports for electrical connections to be made to the rotary position sensor 240 (or potentiometer or pot) housed within the housing 202. The housing 202 may also include features facilitating mounting the cable-locked position sensor 200 to a targeted object or surface (e.g., to a gear motor). In some implementations, the sensor board 242 can form a bottom portion of the housing 202.

Figure 2B:
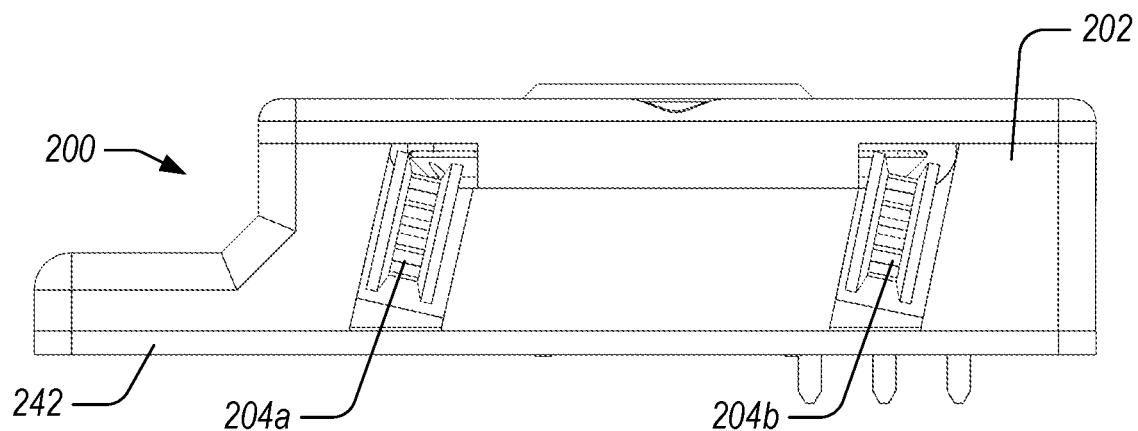

FIG. 2B illustrates that the housing 202 is configured to support grooved wheels 204a, 204b that serve to redirect the cable from the feedback sensor pulley 210 to an output shaft pulley, as described in greater detail herein. The grooved wheels 204a, 204b can be at any suitable angle relative to the housing 202 or the sensor board 242. The angle of the grooved wheels 204a, 204b can be configured to achieve a targeted redirection of the cable so that the cable can be looped around the output shaft pulley in a desirable or advantageous way, as described herein. The grooved wheels 204a, 204b can be configured to rotate relative to the housing 202. This can be accomplished using an axle or protrusions that mechanically couple the grooved wheels 204a, 204b to the housing 202 that allow rotation of the grooved wheels 204a, 204b.

Figure 2C:
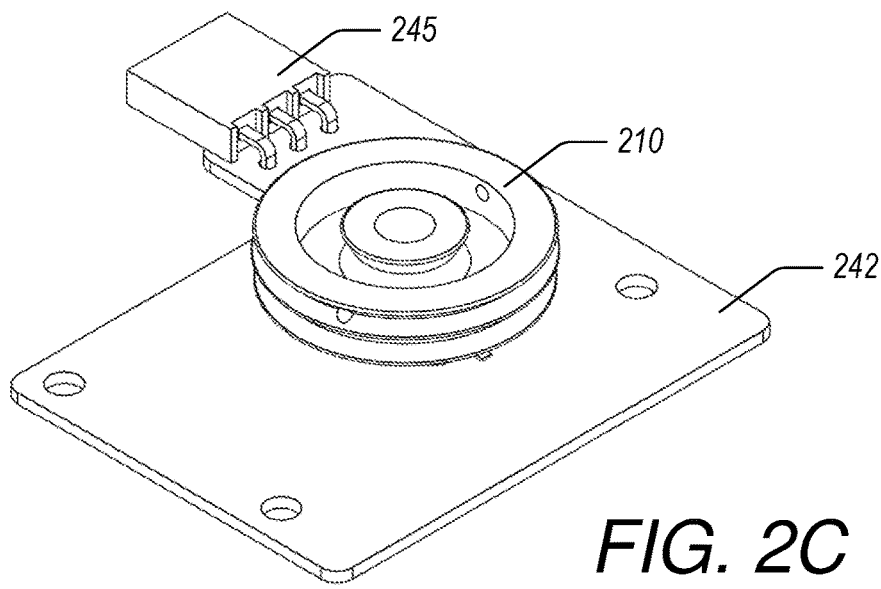
Figure 2D:
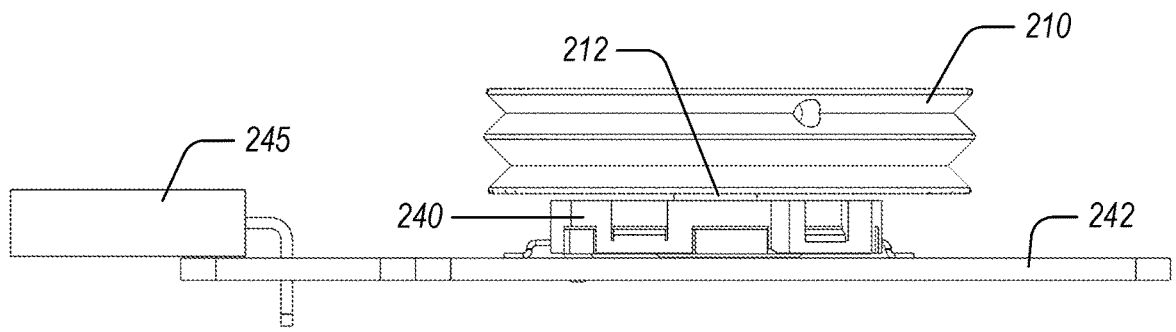
Figure 2E:
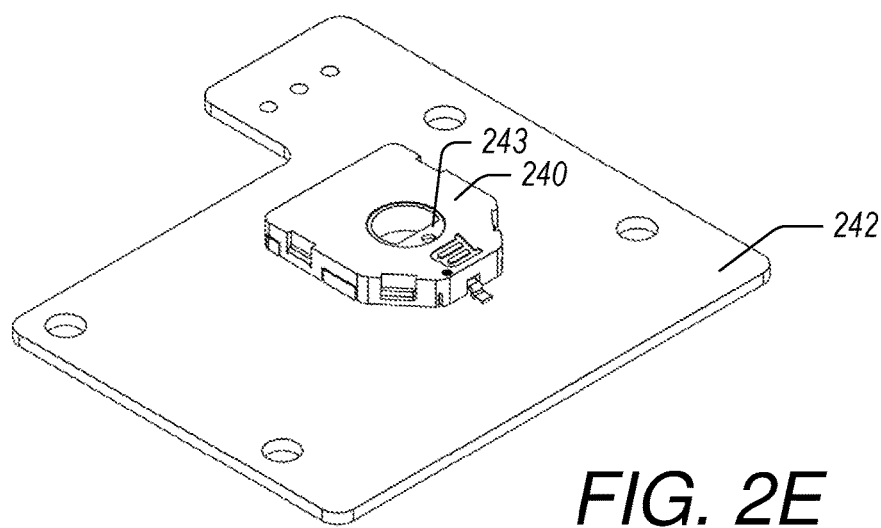

FIGS. 2C-2E illustrate the cable-locked position sensor 200 with the housing 202 removed to reveal components of the cable-locked position sensor 200. In particular, FIGS. 2C and 2D illustrate a perspective view and a side view, respectively, of the cable-locked position sensor 200 without the housing 202 to show the feedback sensor pulley 210, the rotary position sensor 240, the sensor board 242, and a feedback connector 245 (similar to the feedback connector 145 described herein with reference to FIGS. 1A-1D). FIG. 2E illustrates the cable-locked position sensor 200 without the feedback sensor pulley 210 or the feedback connector 245 to show the rotary position sensor 240 coupled to the sensor board 242, the rotary position sensor 240 including a rotatable element 243.

The feedback sensor pulley 210 includes a rotatable shaft 212. The rotatable shaft 212 is part of the feedback sensor pulley 210 or is otherwise mechanically coupled to the feedback sensor pulley 210 such that rotation of the feedback sensor pulley 210 causes the rotatable shaft 212 to rotate. The rotatable shaft 212 is seated in the rotary position sensor 240 to engage with the rotatable element 243 to couple rotation of the feedback sensor pulley 210 to the rotatable element 243. Rotational movement of the rotatable element 243 of the rotary position sensor 240 (e.g., an encoder or potentiometer such as a trim pot) causes the rotary position sensor 240 to output a signal (e.g., using feedback connector 245) that is related to angular position of the rotatable element 243. This, in turn, provides information about the angular position of the feedback sensor pulley 210, and this, in turn, provides information about the angular position of a component coupled to the feedback sensor pulley 210 through a cable. The component can be an output shaft or output shaft pulley, as described herein. In some implementations, the rotary position sensor 240 includes a trim pot. In some implementations, the rotary position sensor 240 has about 300 degrees of usable rotation (e.g., the output signal is accurate for less than a full rotation of the rotatable element 243 and/or feedback sensor pulley 210). In some implementations, gearing can be used between the feedback sensor pulley 210 and the rotatable element 243 to avoid exceeding any rotational limit of the rotary position sensor 240. In some implementations, gearing can be used between the feedback sensor pulley 210 and the component to which it is cable-locked (e.g., an output shaft or output shaft pulley) to avoid exceeding any rotational limit of the rotary position sensor 240. Gearing may also be combined between components of the rotary position sensor 240, the feedback sensor pulley 210, and the component to which the feedback sensor pulley 210 is cable locked to avoid exceeding any rotational limit of the rotary position sensor 240.

In the cable-locked position sensor 200, the combination of the rotatable element 243 of the rotary position sensor 240 and electronics on the sensor board 242 creates an electrical signal correlated to the rotation of the feedback sensor pulley 210. This information can be used by other circuitry (e.g., the circuitry 165 described herein with reference to FIGS. 1A-1D) to determine a position or angle of an output shaft and, relatedly, the angular velocity and/or angular acceleration of the output shaft.

In some embodiments, the cable-locked position sensor 200 includes additional electronics on the sensor board 242 to modify the signal output by the rotary position sensor 240 to achieve a targeted relationship (e.g., linear) between the position of the feedback sensor pulley 210 and the output signal. The feedback connector 245 can be configured to receive a supply voltage, to connect to a reference potential, and/or to provide output signals indicative of the rotational position of the measurement component of the rotary position sensor 240. In some embodiments, the rotary position sensor 240 may be connected as a three-wire tapped resistor (voltage divider), in a control circuit, or may be packaged with electronics to produce a measurement signal in a useful form, such as a variable voltage, variable current, pulse encoder, USB or RS232 communications.

Figure 3A:
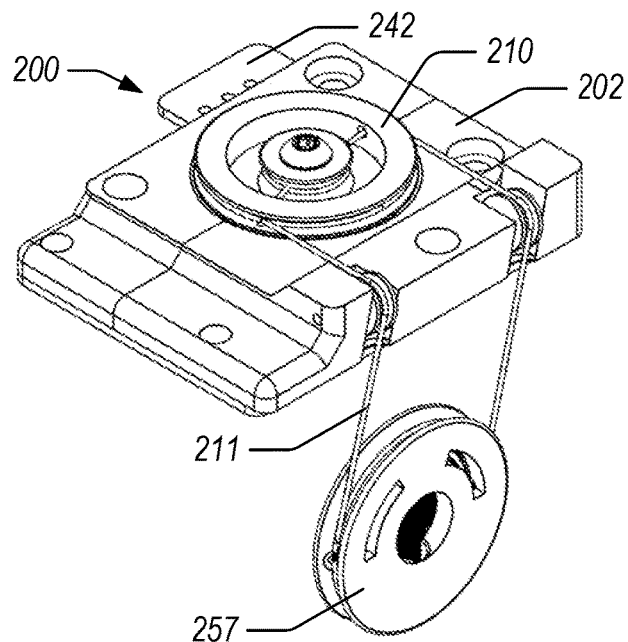
FIGS. 3A, 3B, 3C, and 3D illustrate various views of the cable-locked position sensor of FIGS. 2A-2E without portions of the housing to illustrate routing of a cable to mechanically lock rotation of a component such as a shaft or pulley (e.g., an output shaft or output shaft pulley) to rotation of the feedback sensor pulley.
Figure 3B:
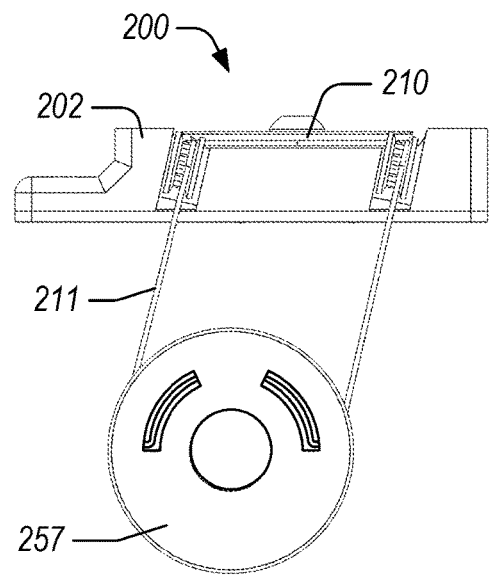
Figure 3C:
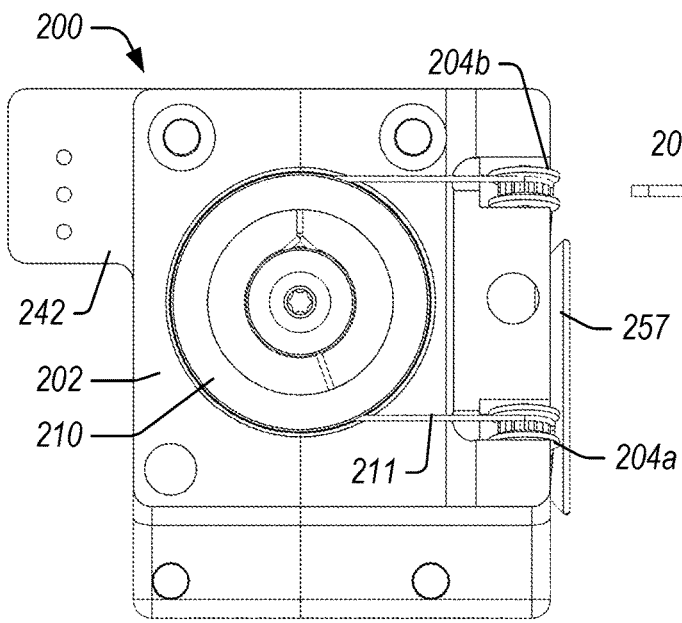
Figure 3D:
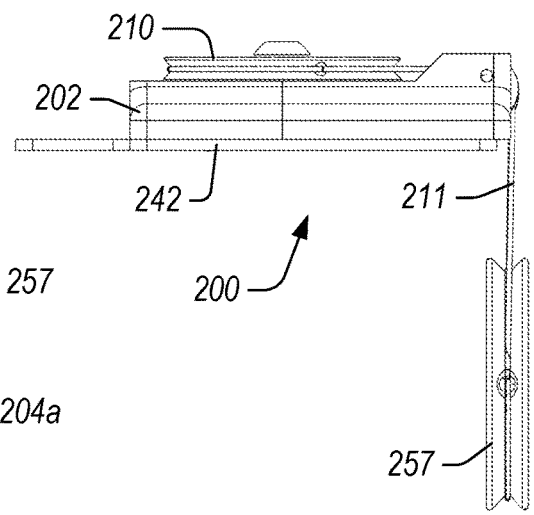

FIGS. 3A, 3B, 3C, and 3D illustrate various views of the cable-locked position sensor 200 without portions of the housing 202 to illustrate routing of a cable 211 to mechanically lock rotation of a component such as a shaft or pulley 257 (e.g., an output shaft or output shaft pulley) to rotation of the feedback sensor pulley 210. The cable 211 is secured to the feedback sensor pulley 210, wrapped around the feedback sensor pulley 210, and routed to the pulley 257. The cable 211 is redirected using the grooved wheels 204a, 204b where it is then secured to the pulley 257 and wrapped around the pulley 257. The cable 211 is then routed back to the feedback sensor pulley 210, making a complete loop. Redirection by the grooved wheels 204a, 204b can be configured to redirect the cable 211 from one plane to another (e.g., a 90 degree turn, an example of which is seen in FIG. 3D) and/or to redirect the cable 211 to compensate for axes of rotation that lie in different planes for the feedback sensor pulley 210 and the pulley 257 (e.g., as seen in FIG. 3B where the cable 211 does not go straight down from the grooved wheels 204a, 204b to the pulley 257).

Figure 4A:
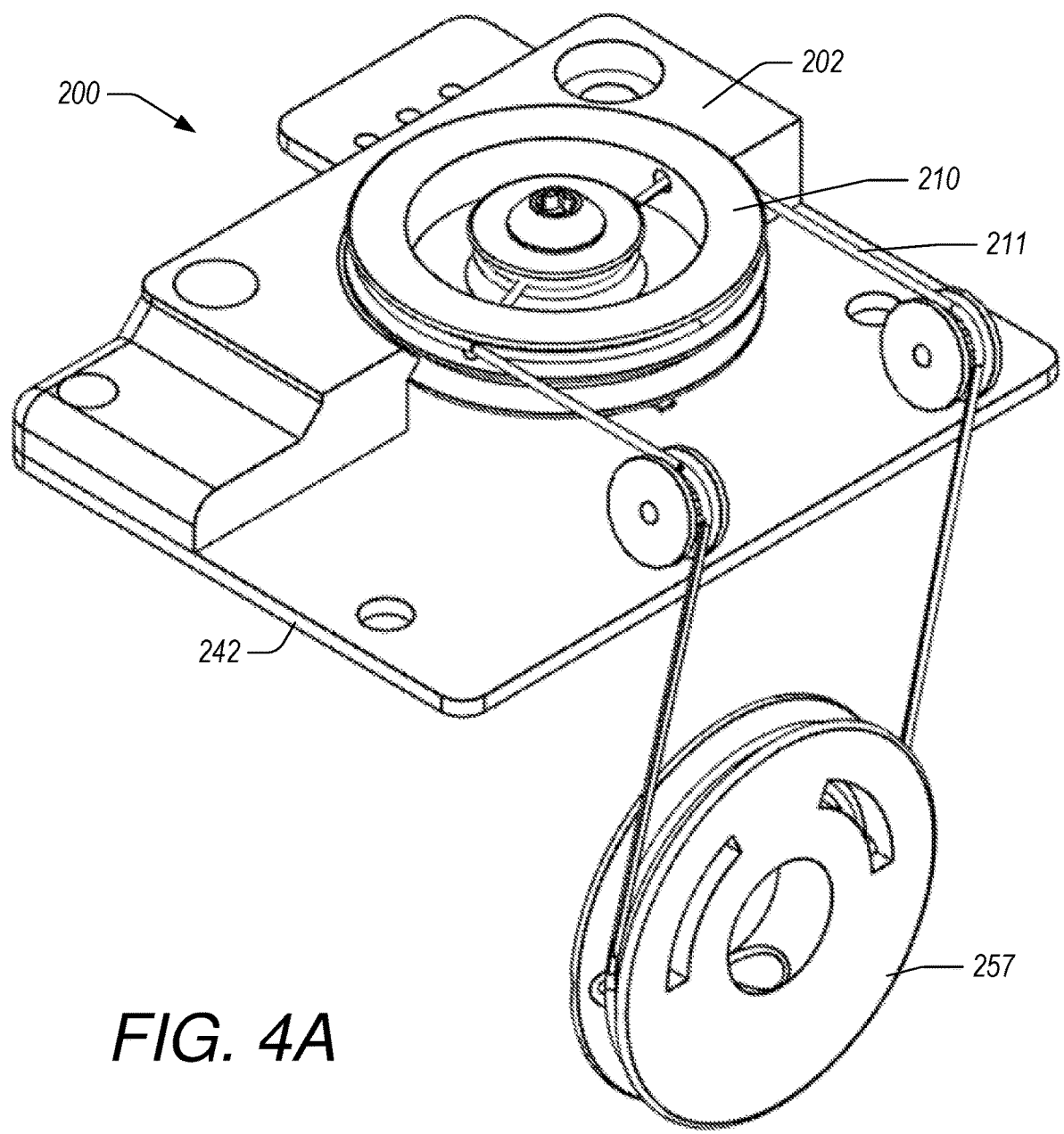
FIGS. 4A and 4B illustrate that the housing of the cable-locked position sensor of FIGS. 2A-2E is configured to support the feedback sensor pulley within the housing in a way that allows the feedback sensor pulley to rotate without the use of bearings.
Figure 4B:
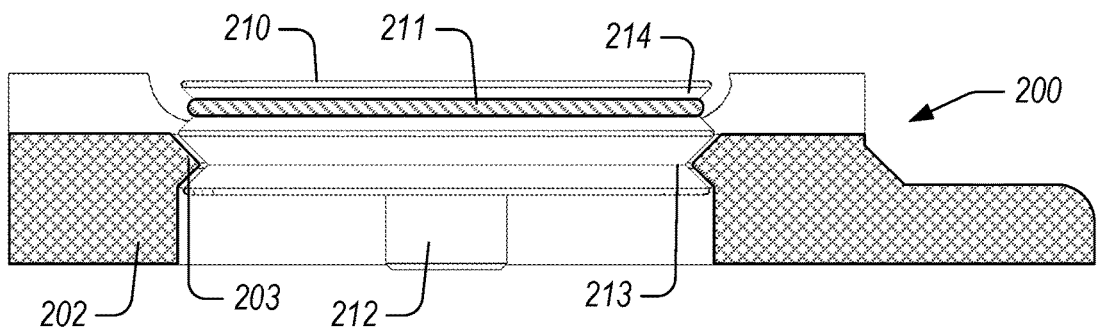

FIGS. 4A and 4B illustrate that, in some embodiments, the housing 202 is configured to support the feedback sensor pulley 210 within the housing 202 in a way that allows the feedback sensor pulley 210 to rotate without the use of bearings. The housing 202 forms a circumferential protrusion 203 that mates with or complements a first circumferential groove 213 of the feedback sensor pulley 210. The first circumferential groove 213 is positioned so that the circumferential protrusion 203 of the housing 202 lies within the first circumferential groove 213. This allows the feedback sensor pulley 210 to rotate relative to the housing 202 without sliding vertically a sufficient amount that would disengage the rotatable shaft 212 from the rotary position sensor 240. The feedback sensor pulley 210 also includes a second circumferential groove 214 that is configured to hold the cable 211. Thus, the feedback sensor pulley 210 includes two grooves, one configured to hold or receive the cable 211 and one configured to secure the feedback sensor pulley 210 within the housing 202 while also allowing the feedback sensor pulley 210 to rotate relative to the housing 202.

Figure 5A:
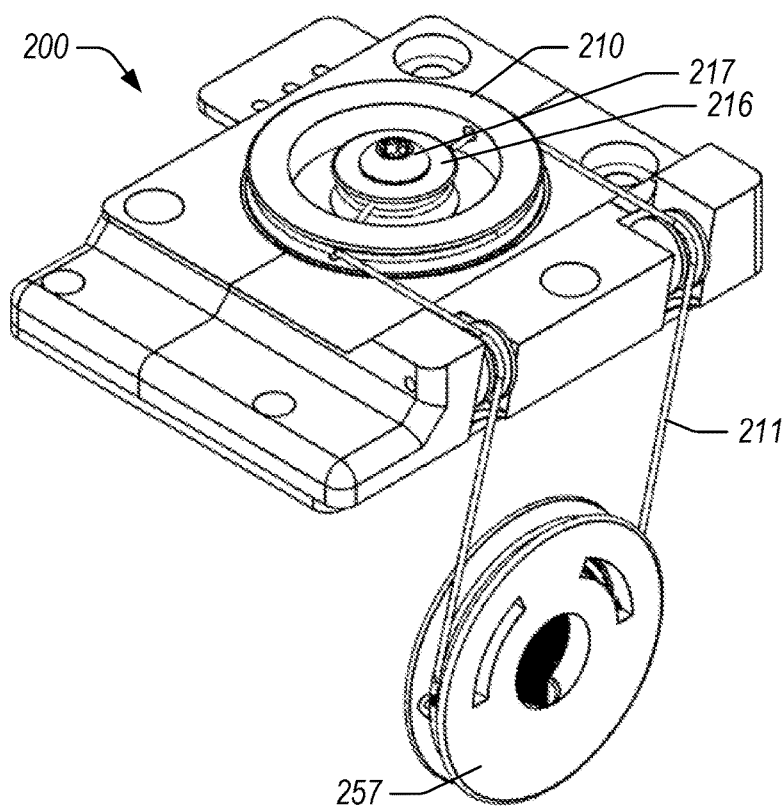
FIGS. 5A and 5B illustrate the routing of the cable of the cable-locked position sensor of FIGS. 2A-2E with components such as the feedback sensor pulley and the pulley shown.
Figure 5B:
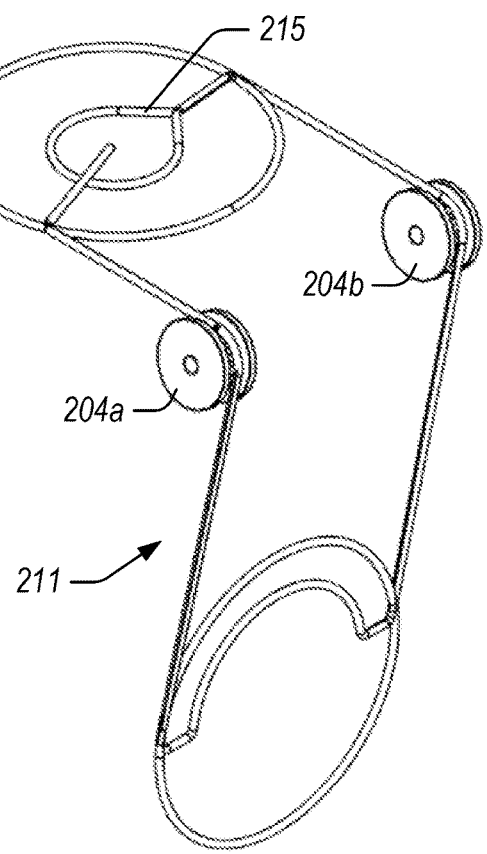

FIGS. 5A and 5B illustrate the routing of the cable 211 to cable-lock the feedback sensor pulley 210 and the pulley 257, as described herein. FIG. 5A illustrates the routing of the cable 211 with components such as the feedback sensor pulley 210 and the pulley 257 shown. FIG. 5B illustrates the routing of the cable 211 with those components removed to better show the routing of the cable 211 around the feedback sensor pulley 210 and the pulley 257. It can be seen that the circuitous path of the cable 211 causes the feedback sensor pulley 210 to rotate when the pulley 257 rotates.

The cable locking is accomplished by securing one end of the cable 211 to the center of the feedback sensor pulley 210, e.g., with a loop 215 over a center post 216 in the feedback sensor pulley 210 or a screw 217 secured to the feedback sensor pulley 210. The cable 211 exits from the center of the feedback sensor pulley 210 through a hole or slot and makes a complete rotation around the feedback sensor pulley 210. This locks one end of the cable 211 to the feedback sensor pulley 210. This also provides a length of cable sufficient for one complete rotation of the feedback sensor pulley 210. The cable 211 is then fed to the pulley 257 around the grooved wheel 204b. The cable 211 enters the pulley 257 through a hole or slot and traverses to the other side of the pulley 257 around a shaft that is seated within the pulley 257 (such as an output shaft, as described herein). After exiting the opposite side of the pulley 257, the cable 211 makes a complete rotation around the pulley 257 in the same direction as the loop around the feedback sensor pulley 210. This trip through the center of the pulley 257 and the loop around the pulley 257 serves to lock the cable 211 to the pulley 257 so that rotation of the pulley 257 forces the cable 211 to move with the rotation. In some embodiments, an adhesive can be used to secure the cable 211 to the pulley 257 through the slots in the pulley 257. The cable 211 is then routed back to the feedback sensor pulley 210 around the grooved wheel 204a where the cable 211 enters through a hole or slot in the feedback sensor pulley 210 and is secured to the center of the feedback sensor pulley 210, e.g., with the screw 217. Tension is applied to the cable 211 prior to securing or fastening the cable 211 to the feedback sensor pulley 210 (e.g., by tightening the screw 217) to remove slack in the cable 211 between the feedback sensor pulley 210 and the pulley 257.

Block Diagram of an Example Cable-Locked Position Sensor

Figure 6:
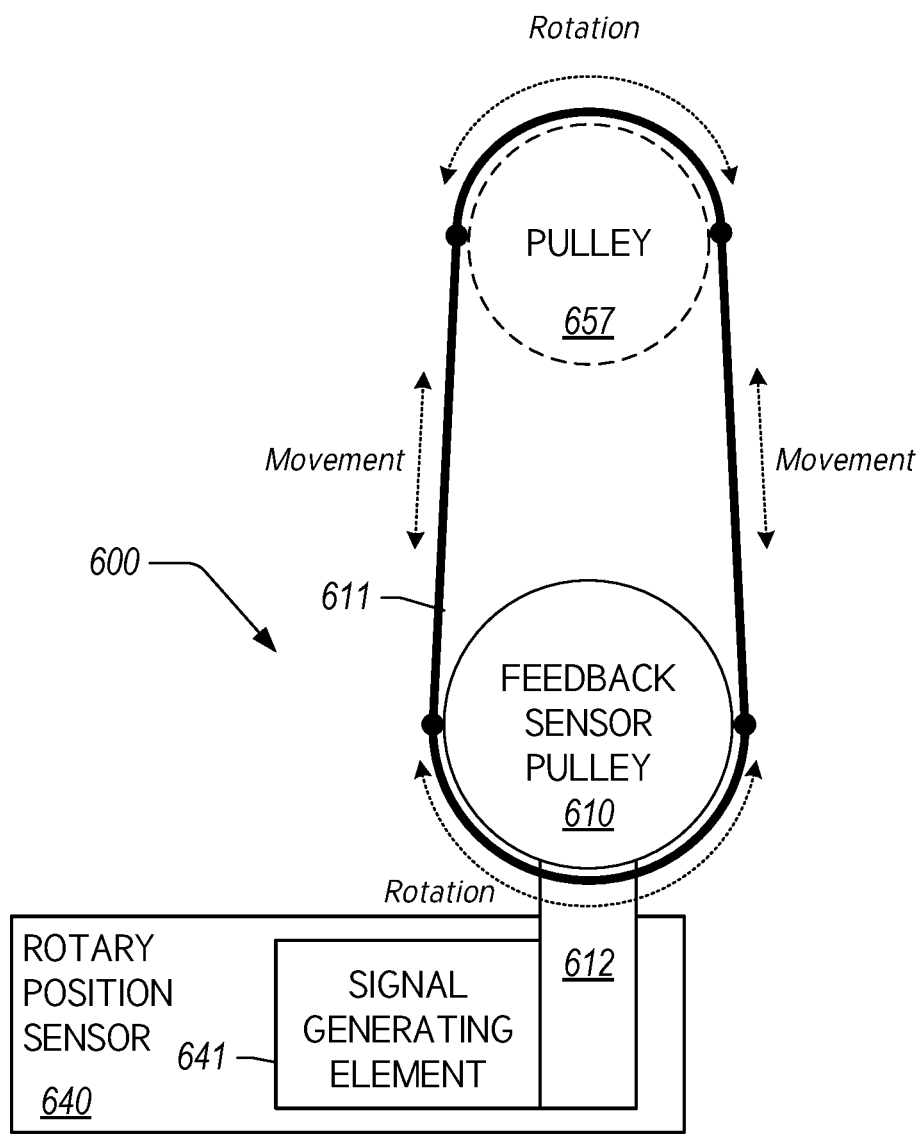
FIG. 6 illustrates a block diagram of an example cable-locked position sensor for measuring rotations.

FIG. 6 illustrates a block diagram of an example cable-locked position sensor 600 for measuring rotations, such as the cable-locked position sensors described herein. The cable-locked position sensor 600 includes a flexible element 611 (e.g., a cable, filament, string, thread, etc.) that is operably locked to a feedback sensor pulley 610. The feedback sensor pulley 610 is mechanically coupled to a rotary position sensor 640 so that rotation of the feedback sensor pulley 610 causes a component of the rotary position sensor 640 to rotate. The feedback sensor pulley 610 is operably locked to another pulley 657 with the flexible element 611. In some embodiments, the pulley 657 can be coupled to an output shaft of a motor unit or gear motor, as described herein, to provide signals indicative of the position or rotation of the output shaft.

The cable-locked position sensor 600 also includes the rotary position sensor 640 that generates an output signal corresponding to the rotation of the feedback sensor pulley 610 caused by rotation of the pulley 657, the rotation of the two pulleys being locked with the flexible element 611. As used herein, the term "locked" in relation to the rotation of the two pulleys being locked together refers to the fact that rotation of the pulley 657 causes a corresponding rotation in the feedback sensor pulley 610. However, this does not imply or indicate that the rotations are at a ratio of 1:1. The sizes of the pulleys determines the ratio of rotation (e.g., 1 full rotation of the pulley 657 results in X rotations of the feedback sensor pulley 610, where X can be equal to 1 or any positive number larger or smaller than 1). The ratio of rotation can be tailored for a particular application.

As described herein, the feedback sensor pulley 610 can be coupled to the rotary position sensor 640 by way of a coupler shaft 612 extending from the feedback sensor pulley 610 to the rotating component of the rotary position sensor 640. The coupler shaft 612 is coupled to a signal generating element 641 that generates an electrical signal in response to rotation of the coupler shaft 612. Thus, because the pulley 657 is locked to the feedback sensor pulley 610, rotation of the pulley 657 causes the coupler shaft 612 to rotate, which in turn causes the signal generating element 641 to generate a corresponding electrical signal that is output by the rotary position sensor 640. In some embodiments, the rotary position sensor 640 includes a single- or multi-turn linear potentiometer.

Block Diagram of an Example Servo Motor

Figure 7:
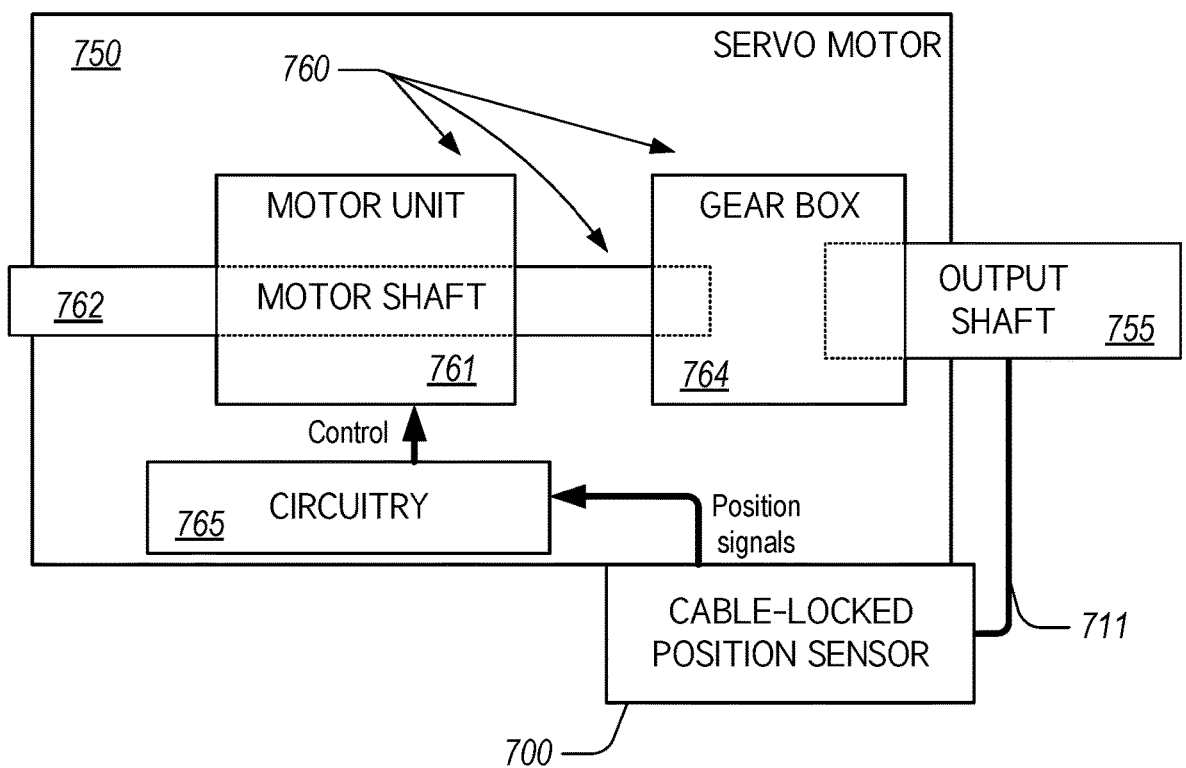
FIG. 7 illustrates a block diagram of an example servo motor that combines a gear motor with a cable-locked position sensor.

FIG. 7 illustrates a block diagram of an example servo motor 750 that combines a gear motor 760 with a cable-locked position sensor 700, such as the position sensors described herein with reference to FIGS. 1A-6. The gear motor 760 includes a motor unit 761, a motor shaft 762, and a gear box 764 with one or more gears. The servo motor 750 includes an output shaft 755. The one or more gears of the gear box 764 couples the motor shaft 762 to the output shaft 755. The one or more gears are configured so that multiple rotations (not necessarily a whole number) of the motor shaft 762 results in a single rotation of the output shaft 755. In some embodiments, the ratio of rotations of the motor shaft 762 to rotations of the output shaft 755 can be in the range of 2:1 to 1000:1 or any reasonable ratio required for an application in which the servo motor 750 is to be used. For example, the ratio can be at least 2:1, at least 10:1, at least 100:1, or at least 1000:1. The servo motor 750 includes the cable-locked position sensor 700 coupled to the output shaft 755. Rotation of the output shaft 755 causes a cable 711 of the cable-locked position sensor 700 to rotate a component of the cable-locked position sensor 700. The cable 711 can be any suitable extensible element (e.g., a cable, filament, string, thread, etc.) that is operably coupled to the output shaft 755 (e.g., by connecting directly to the output shaft 755 or by way of a pulley attached to the output shaft 755, as described herein). The servo motor 750 includes circuitry 765 configured to receive position signals from the cable-locked position sensor 700.

In some embodiments, the cable-locked position sensor 700 is configured to provide a signal corresponding to a displacement of the cable 711. In some embodiments, the cable-locked position sensor 700 is configured to provide a signal corresponding to a rotational angle of the output shaft 755. In some embodiments, the circuitry 765 is further configured to generate an absolute position of the output shaft 755 based on the signal received from the cable-locked position sensor 700. In some embodiments, the circuitry 765 is further configured to provide control of the absolute position or rotational angle of the output shaft 755 based on the signal received from the cable-locked position sensor 700.

A conversion kit can be made to convert a gear motor into a servo motor using the cable-locked position sensor 700 and the circuitry 765 to control the gear motor based on the position signals from the cable-locked position sensor 700. For example, the gear motor 760 with the motor unit 761, the motor shaft 762, the gear box 764, and the output shaft 755 can be converted to the servo motor 750 by adding the cable-locked position sensor 700 and the circuitry 765 that interfaces with the gear motor 760. The circuitry 765 interfaces with the gear motor 760 and the cable-locked position sensor 700 to control the gear motor 760 based on signals from the cable-locked position sensor 700. In this way, a relatively inexpensive gear motor can replicate the functionality of an expensive servo motor or be turned into a servo motor with the addition of the conversion kit that includes the cable-locked position sensor 700, the circuitry 765, and/or mounting components to couple the cable-locked position sensor 700 and the circuitry 765 to the gear motor 760.

Terminology and Additional Embodiments

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill and are intended to form a part of this disclosure.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list. The word "exemplary" is used exclusively herein to mean "serving as an example, instance, or illustration." Any implementation described herein as "exemplary" is not necessarily to be construed as preferred or advantageous over other implementations.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein can be applied to other methods and systems, and are not limited to the methods and systems described above, and elements and acts of the various embodiments described above can be combined to provide further embodiments. Accordingly, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A cable-locked position sensor comprising:
   a feedback sensor pulley comprising a circumferential groove;
   a rotary position sensor mechanically coupled to the feedback sensor pulley, rotation of the feedback sensor pulley causing a rotatable element of the rotary position sensor to rotate, the rotary position sensor configured to output an electrical signal in response to a position or movement of the rotatable element; and
   a flexible cable received within the circumferential groove of the feedback sensor pulley, the flexible cable having a first end secured to a central portion of the feedback sensor pulley, the flexible cable routed through a first opening of the feedback sensor pulley, around the circumferential groove to make a complete rotation around the feedback sensor pulley, the flexible cable further routed to an output shaft and coupled to the output shaft, the flexible cable further routed back to the feedback sensor pulley and attached to the central portion of the feedback sensor pulley,
wherein rotation of the output shaft causes the flexible cable to move to cause a corresponding rotation of the feedback sensor pulley which further causes rotation of the rotatable element of the rotary position sensor to thereby generate the electrical signal that is indicative of the position or movement of the output shaft.

2. The sensor of claim 1 further comprising a rotatable shaft coupled to the feedback sensor pulley and to the rotatable element to transfer rotational movement of the feedback sensor to rotational movement of the rotatable element.

3. The sensor of claim 1 further comprising a housing configured to house the feedback sensor pulley and the rotary position sensor.

4. The sensor of claim 3, wherein the housing forms a circumferential protrusion that mates with a second circumferential groove of the feedback sensor pulley, wherein the feedback sensor pulley is housed within the housing in a way that the circumferential protrusion lies within a space left by the second circumferential groove so that the feedback sensor pulley is restrained in its vertical movement and allowed to rotate relative to the housing.

5. A servo motor comprising:
a gear motor including a motor unit, a motor shaft, a gear box, and an output shaft coupled to the motor shaft by way of the gear box, the gear box having one or more gears coupled to the motor shaft and to the output shaft to cause multiple rotations of the motor shaft to result in a single rotation of the output shaft;
a cable-locked position sensor coupled to the gear motor, the cable-locked position sensor including:
a feedback sensor pulley comprising a circumferential groove;
a rotary position sensor mechanically coupled to the feedback sensor pulley, rotation of the feedback sensor pulley causing a rotatable element of the rotary position sensor to rotate, the rotary position sensor configured to output an electrical signal in response to a position or movement of the rotatable element; and
a flexible cable received within the circumferential groove of the feedback sensor pulley, the flexible cable having a first end secured to a central portion of the feedback sensor pulley, the flexible cable routed through a first opening of the feedback sensor pulley, around the circumferential groove to make a complete rotation around the feedback sensor pulley, the flexible cable further routed to the output shaft and coupled to the output shaft, the flexible cable further routed back to the feedback sensor pulley and attached to the central portion of the feedback sensor pulley; and
circuitry configured to receive the electrical signal from the cable-locked position sensor,
wherein rotation of the output shaft causes the flexible cable to move to cause a corresponding rotation of the feedback sensor pulley that further causes rotation of the rotatable element of the rotary position sensor to thereby generate the electrical signal that is indicative of the position or movement of the output shaft.

6. The servo motor of claim 5 wherein the sensor is configured to provide a signal corresponding to an angular displacement of the output shaft.

7. The servo motor of claim 5 wherein the circuitry is further configured to generate an absolute position of the output shaft based on the signal received from the sensor.

8. The servo motor of claim 5 wherein the circuitry is further configured to provide control of an absolute position or rotational angle of the output shaft based on the signal received from the sensor.

9. A conversion kit configured to provide functionality of a servo motor to a gear motor, the conversion kit comprising:
a cable-locked position sensor configured to be mounted to a gear motor, the cable-locked position sensor including:
a feedback sensor pulley comprising a circumferential groove;
a rotary position sensor mechanically coupled to the feedback sensor pulley, rotation of the feedback sensor pulley causing a rotatable element of the rotary position sensor to rotate, the rotary position sensor configured to output an electrical signal in response to a position or movement of the rotatable element; and
a flexible cable received within the circumferential groove of the feedback sensor pulley, the flexible cable having a first end secured to a central portion of the feedback sensor pulley, the flexible cable routed through a first opening of the feedback sensor pulley, around the circumferential groove to make a complete rotation around the feedback sensor pulley, the flexible cable further routed to an output shaft pulley that is configured to be coupled to an output shaft of the gear motor, the flexible cable further routed back to the feedback sensor pulley and attached to the central portion of the feedback sensor pulley; and
circuitry configured to receive the electrical signal from the cable-locked position sensor,
wherein rotation of the output shaft pulley causes the flexible cable to move to cause a corresponding rotation of the feedback sensor pulley that further causes rotation of the rotatable element of the rotary position sensor to thereby generate the electrical signal that is indicative of the position or movement of the output shaft pulley.

10. The conversion kit of claim 9, wherein the cable-locked position sensor further comprises a housing configured to house the feedback sensor pulley and the rotary position sensor.

11. The conversion kit of claim 10, wherein the housing includes one or more features configured to facilitate mounting the cable-locked position sensor to the gear motor.

* * * * *